May 27, 1952 P. R. SEWARD Re. 23,508

AUTOMATIC PLATE INSERTER AND EJECTOR FOR EMBOSSING MACHINES

Original Filed March 22, 1948 5 Sheets-Sheet 1

INVENTOR.

Percy R. Seward

BY

Harry D. Kilgore

Attorney

AUTOMATIC PLATE INSERTER AND EJECTOR
FOR EMBOSSING MACHINES

Original Filed March 22, 1948. 5 Sheets-Sheet 2

INVENTOR.
Percy R. Seward
BY
Harry D. Kilgore
Attorney

May 27, 1952 P. R. SEWARD Re. 23,508

AUTOMATIC PLATE INSERTER AND EJECTOR FOR EMBOSSING MACHINES

Original Filed March 22, 1948 5 Sheets-Sheet 3

INVENTOR.
Percy R. Seward
BY
Harry D. Kilgore
Attorney

Fig. 4
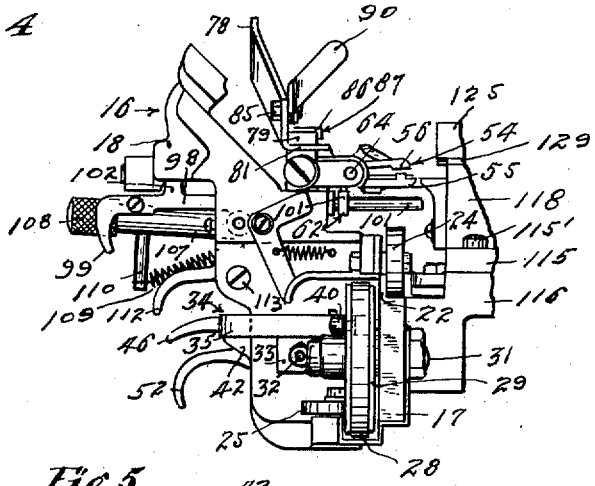
Fig. 5
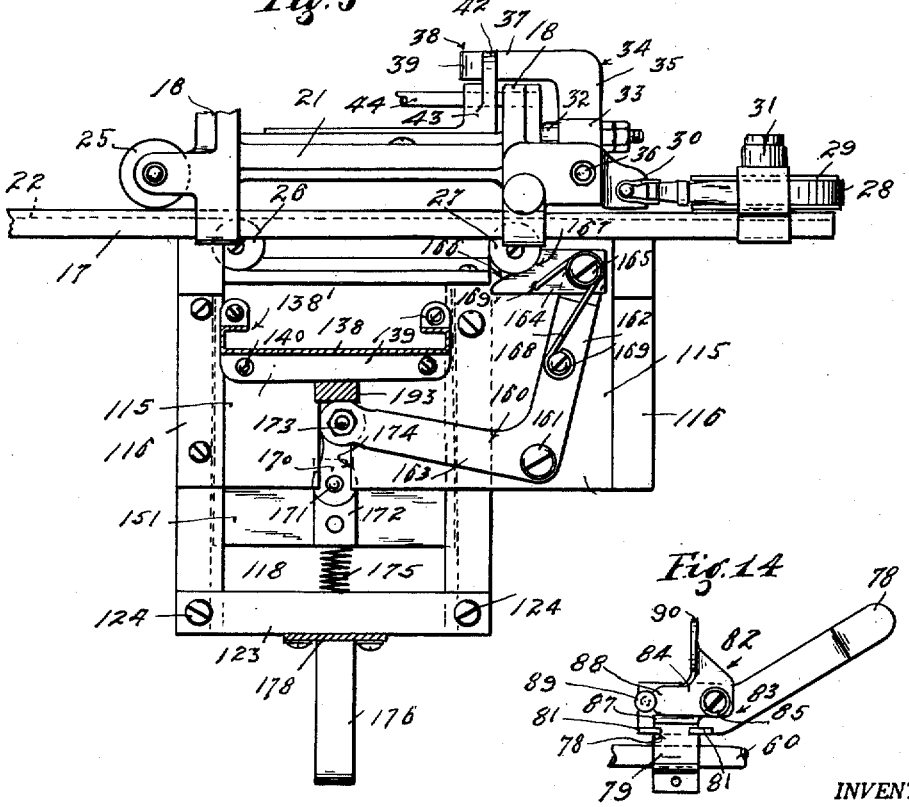
Fig. 14
INVENTOR.
Percy R. Seward
BY
Harry D. Kilgore
Attorney May 27, 1952 P. R. SEWARD Re. 23,508

AUTOMATIC PLATE INSERTER AND EJECTOR FOR EMBOSSING MACHINES

Original Filed March 22, 1948 5 Sheets-Sheet 5

INVENTOR.

Percy R. Seward

BY Henry D. Kilgore

Attorney

Reissued May 27, 1952 Re. 23,508

UNITED STATES PATENT OFFICE 23,508

AUTOMATIC PLATE INSERTER AND EJECTOR FOR EMBOSSING MACHINES

Percy R. Seward, deceased, late of Minneapolis, Minn., by Addressograph-Multigraph Corporation, Wilmington, Del., assignee Original No. 2,534,834, dated December 19, 1950, Serial No. 16,238, March 22, 1948. Application for reissue December 17, 1951, Serial No. 261,992

27 Claims. (Cl. 197—6.6)

Matter enclosed in heavy brackets [ ] appears in the original patent but forms no part of this reissue specification; matter printed in italics indicates the additions made by reissue.

My present invention relates to automatic plate inserting and ejecting mechanism for embossing machines.

It is well known that it is now a hand operation to insert blank plates into an embossing machine and remove the same therefrom, which is a slow and tedious process.

The principal object of this invention is to provide a highly efficient automatic plate inserting and ejecting mechanism for embodiment in a machine for use in embossing indicia, such as names and addresses, upon plates of zinc or similar material, which plates in turn are used for imprinting the names and addresses upon newspapers, magazines and similar mailing pieces.

Other objects of the invention will be apparent from the following description, reference being had to the drawings.

To the above end, generally stated, the invention consists of the novel devices and combination of devices hereinafter described and defined in the claims.

In the accompanying drawings, which illustrate one embodiment of the invention, like characters indicate like parts throughout the several views.

Referring to the drawings:

Fig. 4 is a fragmentary right-hand elevational view of the machine with the plate holder as shown in Fig. 3;

Fig. 5 is a fragmentary bottom plan view of the rear end portion of the attachment with the ejector plate in its projected position;

Figure 1:
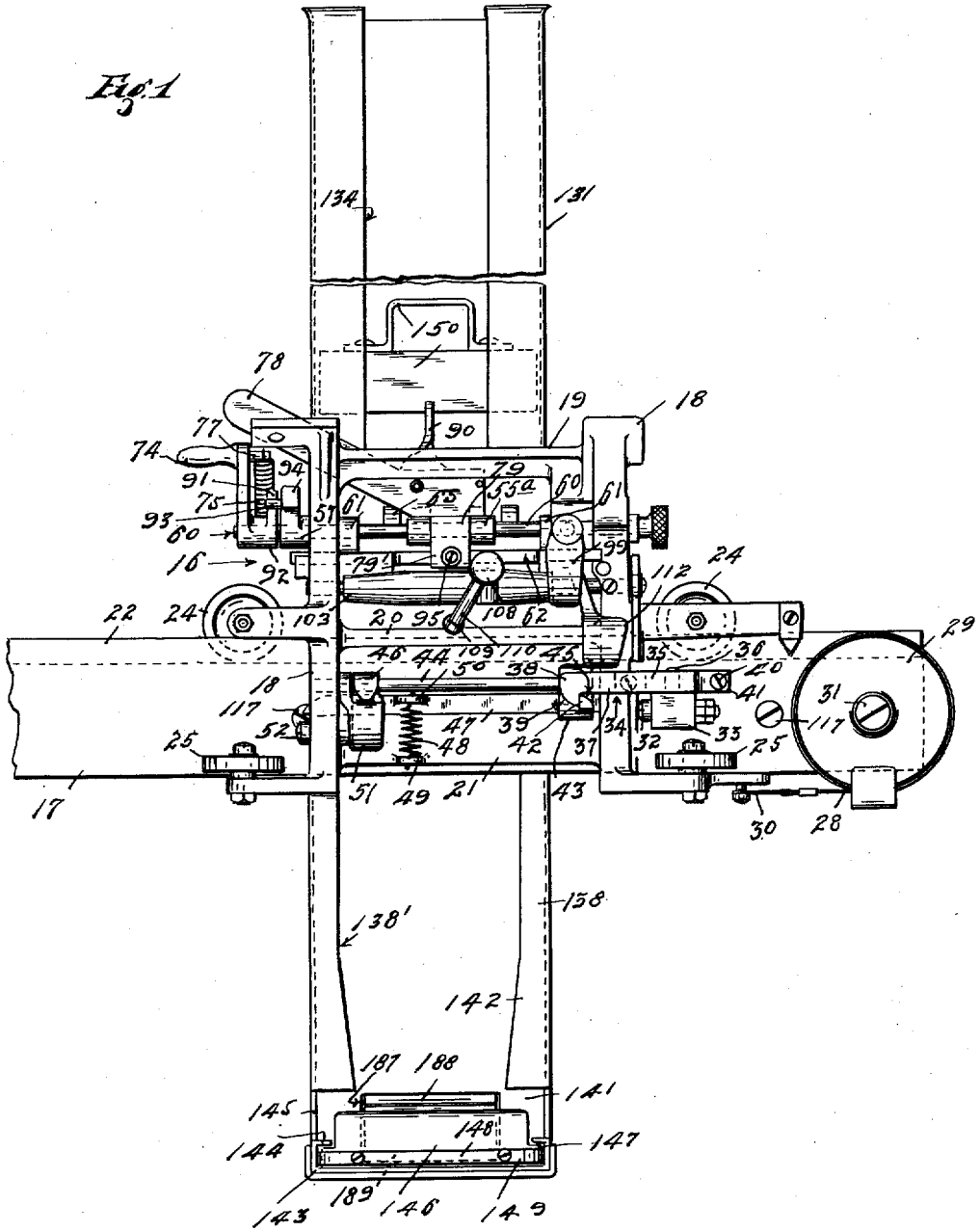
Fig. 1 is a front elevational view of the carriage of a commercial embossing machine, and a fragment of an extension of the track on which it runs, modified to include parts of one embodiment of the invention, and also an attachment that includes the balance of the complete embodiment.
Figure 2:
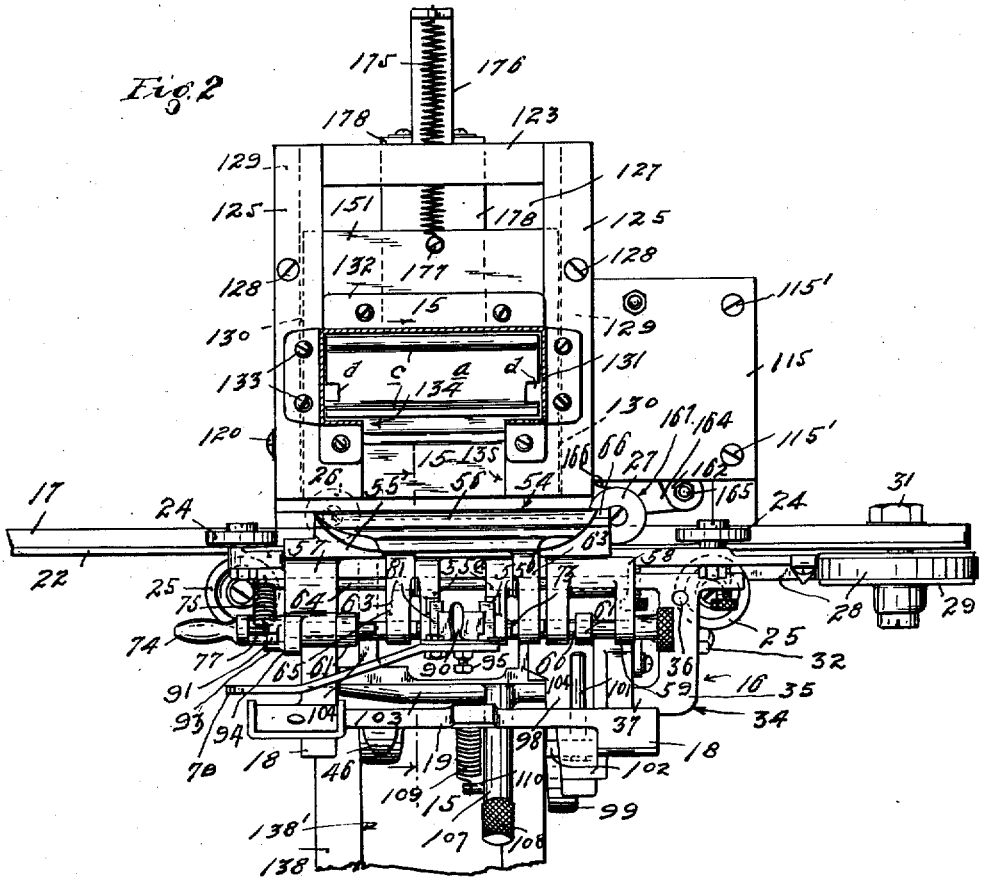
Fig. 2 is a plan view of the same.
Figure 8:
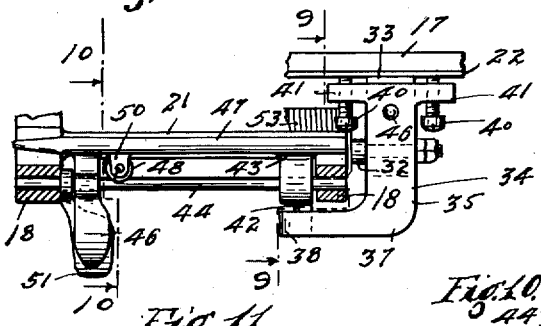
Fig. 8 is a fragmentary detail view partly in plan and partly in section taken on the line 8—8 of Fig. 3.
Figure 9:
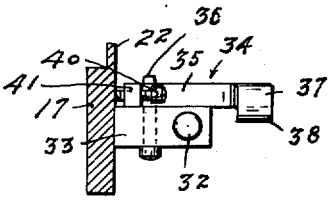
Fig. 9 is a view principally in side elevation with the carriage track sectioned on the line 9—9 of Fig. 8.
Figure 10:
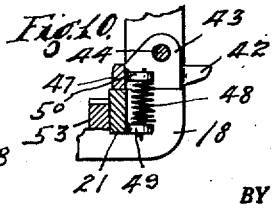
Fig. 10 is a fragmentary detail view partly in side elevation and partly in section taken on the line 10—10 of Fig. 8.
Figure 15:
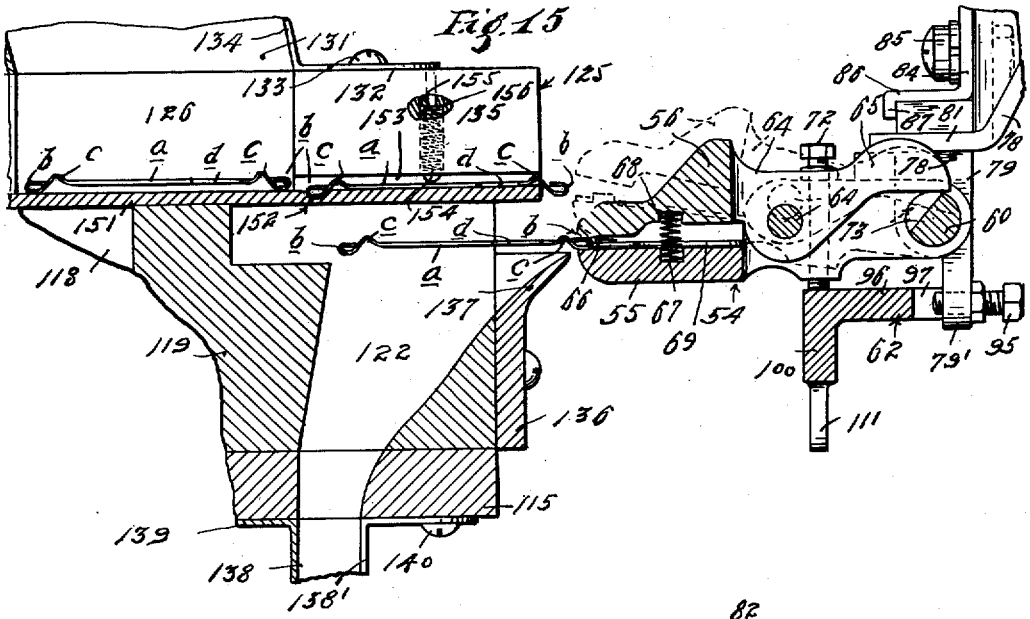

Fig. 14 is a rear elevational view of the plate holder holding and tilting device; and Fig. 15 is a fragmentary detail view principally in vertical section taken on the line 15—15 of Fig. 2, on a greatly enlarged scale, showing an embossed plate held by the plate holder in position to be ejected into the hopper and also showing, by means of broken lines, the plate holder tilted into a position and the upper jaw opened to receive a blank plate when moved toward the same.

The numeral 16 indicates a mounted carriage of an embossing machine having a portion of my invention embodied therein. This carriage 16 is mounted to run on a fragment of the track 17 that is a right-hand extension of the track for the embossing machine. For the purpose of this case, it is not thought necessary to show the embossing machine except for the parts shown in the drawings.

The frame of the carriage 16 includes a pair of side members 18 rigidly connected by upper, intermediate and lower crosstie members designated by the numerals 19, 20 and 21, respectively. The track 17, as shown, is a rectangular bar and integral therewith is an upstanding rail 32 inset from the inner side of the track 17. Both side members 18 are channeled at 23 to receive the bottom portion of the track 17 on which they slide.

A pair of wheels 24, in tandem, are arranged to run on the top of the track 17 at the side of the track rail 22, a second pair of wheels 25, in tandem, is arranged to run on the front of the track 17 near the bottom thereof, and a third pair of smaller wheels 26 and 27, in tandem, is also arranged to run on the back of the track 17 between the wheels 24. The pairs of wheels 24 and 25 and the two wheels 26 and 27 are all journaled in bearings on the side members 18 and the wheels 25, 26 and 27 turn about vertical axes. The wheel 27, which is outwardly of the carriage 16, at the right thereof, performs an important function, aside from that of guiding the carriage 16 on the track, as will presently appear.

The carriage 16 is moved to the right from the embossing machine into the position shown in the drawings, by a spring 28, of the clock spring type, wound on a narrow drum 29 between peripheral flanges thereon. The spring 28, at its outer end, is attached to the right-hand side member 18 by a separable coupling 30. The drum 29 is journaled at 31 on the track 17 at the front thereof. The spring 28 is under strain at all times to draw the carriage 16 toward the drum 29 and, when in the position shown in the drawings, holds the same against a stop 32 on a bearing block 33 on the track 17 and projecting forwardly therefrom between the carriage 16 and the drum 29. The carriage 16 is manually moved from its position shown in the drawings to the embossing machine and places the spring 28 under tension.

The carriage 16 is automatically locked, in the position shown in the drawings and against the stop 32, by a latch 34. This latch 34 has a forwardly projecting elongated body member 35 that rests, at its inner end portion, on the bearing block 33 and is intermediately pivoted thereto by an upstanding stud 36. Integral with the outer end of the body member 35 is an arm 37 that projects toward the carriage 16 and has on its free end a depending detent 38, the face of which is curved downwardly and inwardly to afford a cam surface 39. A pair of set screws 40 have threaded engagement with a pair of outstanding ears 41 on opposite sides of the body member 35 and impinge the track 17. By adjusting the set screws 40, the body member 35 may be pivotally moved on the stud 36 to adjust the detent 38. It will be noted that the body member 35 and ears 41 are spaced from the track 17 to permit pivotal movement of said body member.

Co-operating with the detent 38 is a latch lug 42 on a hub 43 pivoted on a fixed shaft 44, the end portions of which are mounted in the side members 18. This latch lug 42 has a cam surface 45 and extends outwardly under the arm 37 back of the detent 38 and is released from said detent by a downwardly swinging movement about the axis of the shaft 44. The latch lug 42 is manually released from the detent 38 by means of a lever-acting thumb-piece 46 intermediately pivoted on the opposite end portion of the shaft 44 from the hub 43. This thumb-piece 46 extends forwardly of the shaft 44 and its inner or short end portion is rigidly connected to the hub 43, on the opposite side thereof from the latch lug 42, by a lifting bar 47 that normally rests on the crosstie bar 21. A coiled spring 48 is anchored to a lug 49 on the crosstie bar 21 and attached to a lug 50 on the lifting bar 47 and yieldingly holds said bar on the crosstie bar 21. Underlying the thumb-piece 46 is a finger hold 51 mounted on the shaft 44 and attached to the left-hand side member 18 by a screw 52. This finger hold 51 affords a base of resistance for the operator's hand while operating the thumb-piece 46 to release the latch lug 42 from the detent 38.

During the final movement of the carriage 16 from the embossing machine to its position shown in the drawings, the cam surface 45 on the latch lug 42 engages the cam surface 39 on the detent 38 and cams said latch lug downwardly so that it passes under the detent 38, against the tension of the spring 48, and is then lifted by said spring into interlocking engagement with the detent 38.

Mounted on the side members 18, back of the crosstie bar 21, is a ratchet bar 53 that forms a part of the carriage escapement, but for the purpose of this case it will not be necessary to consider the same.

A holder 54, for the plate a to be embossed, is shown in Fig. 15, and includes a fixed lower jaw 55 and a movable upper jaw 56. This pair of jaws 55 and 56 horizontally disposed parallel to the track 17 are of substantially the same length as the plate a and project rearwardly over said track. On the rear longitudinal edge portion of the lower jaw 55, at the corners thereof, is a pair of long hinge lugs 57 and 58, the latter being at the right. The hinge lug 58 is bifurcated and the prongs thereof are designated by the numeral 59. The hinge lug 57 and the prongs 59 of the hinge lug 58 have aligned bores through which a rock shaft 60 extends for relative turning movement. This rock shaft 60, at its end portions, is journaled in bearings 61 on a carrier 62 for the plate holder 54.

The upper jaw 56 has on its rear longitudinal edge portion a pair of hinge lugs 63 having aligned bores through which a long hinge pin 64 loosely extends and has its end portions fixed in the hinge lugs 57 and 58. This hinge pin 64 extends parallel to the rock shaft 60 between said rock shaft and the jaws 55 and 56. The hinge lugs 63 are extended to afford a pair of cam arms 65 that extend transversely over the rock shaft 60, rest thereon and normally hold the upper jaw 56 closed.

The lower jaw 55 is also provided with a pair of laterally spaced hinge lugs 55[a] between the hinge lugs 63 and provided with pairs of aligned bores through which the rock shaft 60 and the hinge pin 64 extend.

Figure 11:
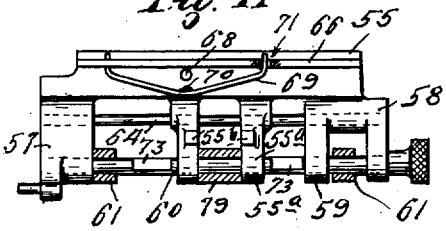
Fig. 11 is a plan view of the lower jaw of the plate holder.

On the upper face of the lower jaw 55 is a flat stop bead 66 that is parallel to the outer longitudinal edge of said jaw and spaced inwardly thereof. The purpose of the stop bead 66 is to limit the movement of the plate a between the jaws 55—56. A coiled spring 67 interposed between the jaws 55—56 is held in bore-like seats 68 in the opposing faces of said jaws and under strain to open the upper jaw 56. A V spring 69 is provided for ejecting a plate a held between the jaws 55—56 when the upper jaw 56 is opened. This spring 69 lies on the face of the jaw 55 and is rigidly secured, at its intermediate portion, to said jaw as indicated at 70. The free end portions of the diverging arms of the spring 69 are bent, just back of the stop bead 66, into parallel arrangement and extend loosely through transverse holes 71 in said bead and outward of said bead to substantially the longitudinal edge of the jaw 55, see Fig. 11.

Adjusting screws 72 extend through the lower jaw 55, have threaded engagement therewith and impinge the plate holder carrier 62 and support said jaw therefrom. By manipulating the screws 72, the lower jaw 55 may be moved about the axis of the rock shaft 60 to raise or lower its front longitudinal edge portion. The rock shaft 60, under each cam arm 65, is flattened to afford a cam surface 73 which, when said arm rests flat thereon, permit the upper jaw 56 to be opened by the spring 67.

Figure 6:
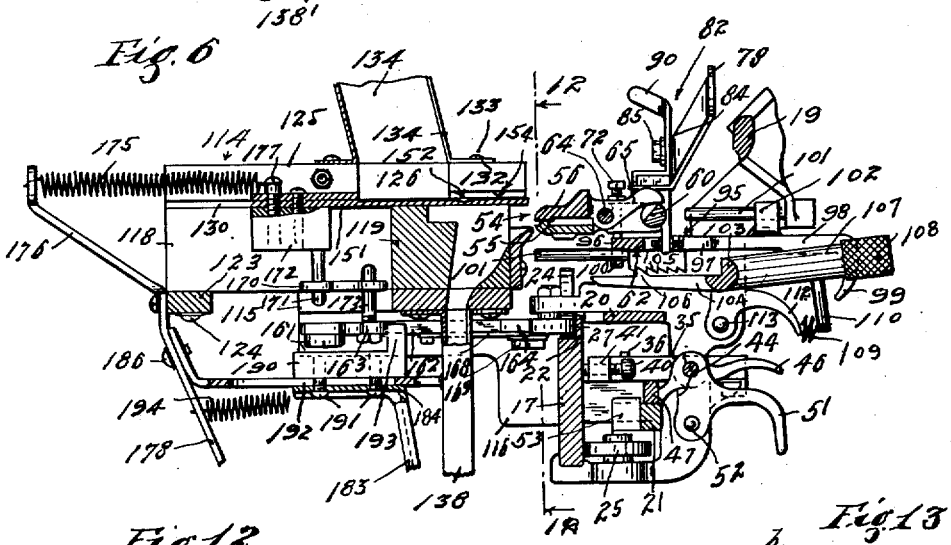
Fig. 6 is a fragmentary view principally in vertical section taken through the machine from the front to the rear thereof and showing the plate holder in an embossed plate-holding position.
Figure 12:
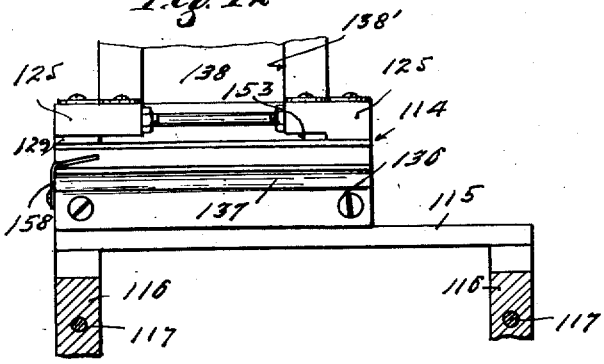
Fig. 12 is a fragmentary view principally in front elevation with some parts sectioned on the line 12—12 of Fig. 6.
Figure 13:
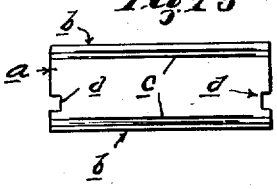
Fig. 13 is a plan view of one of the blank plates.

On the left-hand end portion of the rock shaft 60, outwardly of the carriage 16, is a hand crank 74. A coiled spring 75 anchored at 76 to the lower jaw 55 and attached to an inwardly projecting pin 77 on the outer end portion of the hand crank 74, normally holds the rock shaft 60 as positioned in Fig. 6 and shown by full lines in Fig. 15.

A handle 78 is provided for holding the lower jaw 55, with the adjusting screws 72 in contact with the carrier 62, from lifting when operating the hand crank 74 to turn the rock shaft 60 into a position in which the cam arms 65 rest flat on the cam surfaces 73 and thus release the same to permit the upper jaw 56 to be opened by the spring 67. This handle 78 is detachably secured to a bearing block 79, between the hinge lugs 55a through which the rock shaft 60 extends for relative turning movements. This bearing block 79 is held by the hinge lugs 55a against axial movement on the rock shaft 60 and has in opposite sides thereof grooves 80 that extend transversely over the rock shaft 60. The lower or inner end portion of the handle 78 is in flat engagement with the outer face of the bearing block 79 and has a pair of laterally projecting flat prongs 81 that extend longitudinally through the grooves 80 and rearwardly thereof over upstanding bosses 55b on the hinge lugs 55a. A latch 82 is provided for detachably holding the handle 78 with its prongs 81 interlocked with the bearing block 79. This latch 82 is in the form of an angle member 83, the upright member 84 of which is in contact with the inner side of the handle 78 and is attached thereto by a pivot 85. The horizontal member 86 of the latch 82 rests on the top of the bearing block 79 and has a downturned flange 87 that overlaps the opposite side of the bearing block 79 from the handle 78. The latch member 84 has on its free outer end portion a lip extension 88 that normally extends under the head on the stud 89 on the handle 78. This latch member 84 has on its pivoted end portion an upstanding finger-piece 90 by which the latch 82 may be moved pivotally to lift the flange 87 above the bearing block 79 and also lift the lip extension 88 out of interlocking engagement with the headed stud 89. The handle 78, from the bearing block 79, extends obliquely upwardly and outwardly and its upper end portion is closely positioned to the hand crank 74.

While the operator is turning the rock shaft 60, by means of the hand crank 74, to release the cam arms 65 and permit the upper jaw 56 to open, he is at the same time holding the handle 78 with its prongs 81 pressed against the bosses 55a and thus prevents the lower jaw 55 from lifting, or, in other words, prevents the plate holder 54 from turning about the axis of the rock shaft 60.

At the limit of the movement of the hand crank 74, in turning the rock shaft 60 to release the closed upper jaw 56, a short radial arm 91 on the hub 92 thereof engages a crank pin 93 on a crank arm 94 on the hinge lug 57.

Continued movement of the hand crank 74 acting through the crank arm 94 will tilt the entire plate holder 54 into a position in which it is stopped by the engagement of an adjustable screw 95 having threaded engagement with a depending member 79′ on the bearing block 79, with the carrier 62.

The carrier 62 includes a flat body member 96 that extends transversely of the carriage 16 and an outwardly projecting side member 97 on the right-hand end portion of the body member 96. The outer end portion of the side member 96 is reduced in width to afford a handle 98 having on its outer end a finger-piece 99. On the inner longitudinal edge portion of the body member 96 is a depending flange 100. The carrier 62 is slidably mounted, for movement toward and from the track 17, on three horizontal pins 101 that project toward said track 17. Two of these pins 101 are laterally spaced and secured one to each of the frame side members 18 and extend through transverse holes in the flange 100. The other pin 101 is integral with the right-hand frame side member 18 and extends through a hole in an upstanding bearing 102 on the handle 98.

The following connections are provided for sliding the plate holder carrier 62 on the pins 101 and for retracting the same, to wit: a rock shaft 103 having reduced end portions, is journaled in the frame side members 18. Integral with the rock shaft 103 is a pair of laterally spaced arms 104 that project toward the track 17. On the upper face of each arm 104 is a ratchet tooth 105 that meshes with ratchet teeth 106 on the under side of the carrier body member 96. The rock shaft 103 is provided, at its longitudinal center, with an outwardly projecting handle 107 having a knurled outer end portion 108. A coiled spring 109, anchored to a depending pin 110 on the handle 107 and attached to a lug 111 on the under side of the carrier body member 96, yieldingly holds the carrier 62 in its retracted position.

Underlying the handle 98 is a finger hold 112 for one of the operator's fingers while sliding the carrier 62 on the pins 101 by means of the finger-piece 99. This finger hold 112 has an expanded inner end portion through which the respective end portions of the rock shaft 103 extend and is held from turning on said shaft by a screw 113 in the right-hand end member 18. The spring 106, in addition to retracting the carriage 16, yielding holds the arms 104 with their ratchet teeth 105 in engagement with the ratchet teeth 106 on the carrier 62.

On the opposite side of the track 17 from the carriage 16 is an attachment that embodies the balance of my invention. This attachment includes a housing 114 on a bed plate 115 supported on a pair of brackets 116 rigidly secured to the track 17 by screws 117. This bed plate 115 is secured to the brackets 116 by screws 115′. The housing 114 includes a pair of laterally spaced rectangular side members 118 that are perpendicular to the track 17. A large rectangular member 119 is interposed between the side members 118 at the front end portions thereof and secured thereto by screws 120 and dowel pins 121.

Formed in the body member 119 is a hopper 122 that extends completely through said body member, from top to bottom thereof, and it also extends completely through the bed plate 115. The side members 118 extend materially rearwardly of the bed plate 115 and are connected at their rear end portions by a crosstie bar 123 that extends thereunder and is secured thereto by screws 124.

The housing 114 also includes a top member 125 having in its front end portion, over the body member 119, a chamber 126 for holding the lower end portion of a stack of plates a, as will presently appear. In the rear end portion of the top member 125 in an aperture 127 that extends the full distance between the side members 118. The top member 125 is detachably secured to the side members 118 by screws 128.

Spacing strips 129 are interposed between the side members 118 and the top member 125 and are held in place by the screws 128 which extend therethrough. It is important to note that the spacing strips 129 are inset from the inner faces of the side members 118 to form ways 130, for a purpose which will presently appear.

A magazine 131 for holding a stack of plates a is mounted on the top member 125 with its lower end in registration with the chamber 126. This magazine 131 is in a slightly rearwardly inclined position and has on its lower end outturned flanges 132 secured by screws 133 to the top member 125. The central portion of the front member of the magazine 131 is open from the top to the bottom thereof, as indicated at 134. This opening 134 also extends through the top member 125 between the chamber 126 and the front thereof, as indicated at 135. The hopper 122, the chamber 126 and the magazine 131 are all of the same length and said hopper and chamber are of the same width. Plates a in the magazine 131 and the chamber 126 have a working clearance therewith so that they gravity feed therein.

The openings 134 and 135 permit inspection to see if the plates a are feeding properly and the number of plates in the hopper 122 and the chamber 126. The opening 135 also permits inspection of the hopper 122.

Attached to the body member 119, at the outer face therewith, is a plate 136 having in the intermediate portion at the top thereof an outturned lip 137, the inner surface of which is inwardly and downwardly inclined and leads into the hopper 122. The back wall of the hopper 122 is flat and slightly downwardly and rearwardly inclined while the front wall thereof is downwardly and rearwardly inclined on an angle that restricts the bottom of the hopper 122 to a narrow passageway through the bed plate 115, so that embossed plates a precipitated therein from the plate holder 54 are turned from a horizontal position into a vertical position. It is important to note that the outer longitudinal edge of the lower jaw 55 is very close to the lip 137 when the plate holder is in plate-ejecting position, and that the top member 125 projects forwardly of the side members 128 and body member 119.

A down spout 133 at its upper end is in registration with the bottom opening in the hopper 122 and has outturned flanges 139 secured to the bed plate 115 by screws 140. The front member of the spout 138 has an intermediate opening 138' that extends the full length thereof and exposes the interior of said spout for inspection. The spout 138 has at its lower end portion, at the front thereof, an escape opening 141 for the plates a. The front member of the spout 138, above the escape opening 141, is downwardly and rearwardly inclined at 142 to further restrict the width of the spout 138 and more closely hold the plates in vertical positions.

The spout 138, at its lower end, is attached to a horizontal forwardly projecting long tray 143 having on the upper edges of its side members narrow intermediate flanges 144, and the outer end of said tray is open. The side members of the spout 138, at the escape opening 141, are extended outwardly to afford guide members 145 for the plates a that are in the same planes as the side members of the tray 143, see Fig. 3. Slidably mounted in the tray 143 is an abutment 146 for the plates a and has, on its end, shoulders 147 that extend under the flanges 144 that hold the abutment 146 in the tray 143. The inner face 146' of the abutment 146 is upwardly and outwardly inclined to hold the plates a in the tary 143 in the same inclined position. A leaf spring 148 is secured to the abutment 146 at its outer face and has curved end portions that extend under the flanges 144 and yieldingly engage the sides of the tray 143. The purpose of this spring 148 is to produce a drag and prevent the abutment 146 from being moved too freely. Within the magazine 131 is a handle-equipped weight 150 which may be presumed to be resting on the top of a stack of plates a in said magazine in close contact, the one with the other, and assists in the feeding of the same.

The plates a in the chamber 126 are successively removed, the lowermost from the bottom of the stack, by an ejector blade 151 slidably mounted in the ways 130 and on which ejector plate the stack rests.

The longitudinal edge portions of the plate a are rounded and thickened by folding the same upwardly and inwardly upon themselves and then downwardly offsetting the same until the upper ply is in the plane of the body of the plate to afford reinforcing ribs b. Inwardly of each rib b the plate a is upset to form on the upper side thereof a longitudinal bead c that extends the full length thereof parallel to said rib. In each end of the plate a is a notch d.

Formed in the ejector plate 151 is a transverse groove 152 in which the rear rib b of the lowermost plate a in the chamber 126 extends when the ejector plate 151 is retracted. The ejector plate 151, at its front longitudinal edge, engages the back of the front rib b and thus holds the lowermost plate a for ejection from the chamber 126. By reference to Fig. 15, it will be noted that the under side of the top member 125 is rabbeted at 153, above the respective way 130, to afford working clearance for the beads c on the plate a being ejected.

A friction ball 154 is held in a bore 155 in the top member 125 over the rabbet 153. The bore 155 at its lower end is slightly contracted to hold the ball 154 therein. A coiled spring 156 in the bore 155 is compressed between the bottom of the bore 155 and the ball 154 and yieldingly holds said ball projected into the rabbet 153 to engage a plate a being ejected and steadies the same.

Formed in the left-hand side member 18, below the respective spacing strip 129, is an entrance passageway 157, that is open at the front of said side member for an embossed plate a being returned from the embossing machine by the plate holder 54. The bottom of the passageway 157 is flush with the upper edge of the lip 137. A leaf spring 158, attached to the left-hand side member 118 on the outer side thereof, extends obliquely into the passageway 157 to steady an embossed plate a being moved through said passageway by the plate holder 54.

Figure 3:
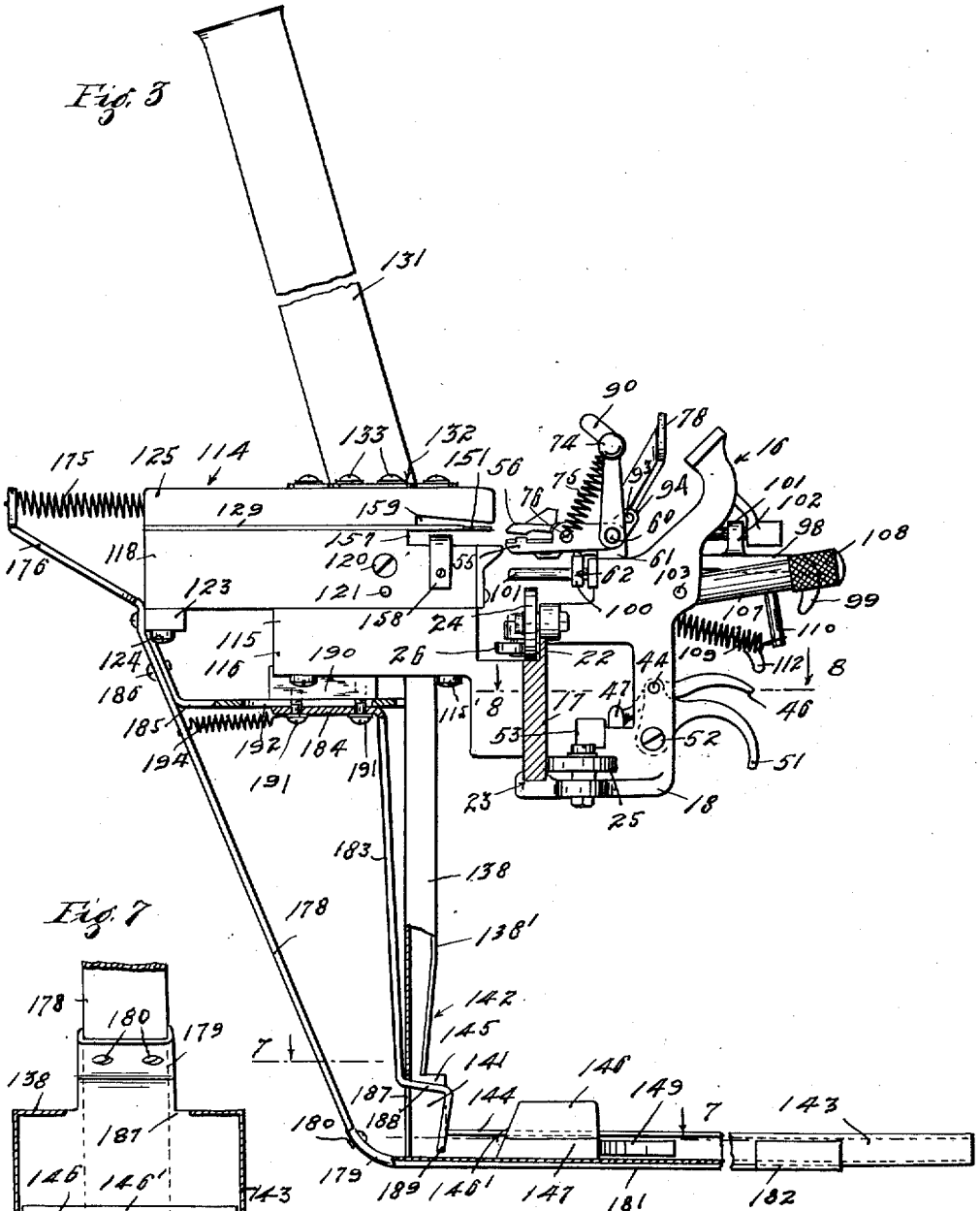
Fig. 3 is a left side elevational view of the machine in which the plate holder is in plate-ejecting position.
Figure 7:
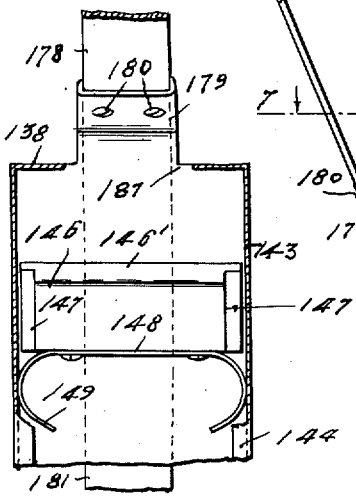
Fig. 7 is a fragmentary plan view partly in plan and partly in section taken on the irregular line 7—7 of Fig. 3.

In the top member 125, above the left-hand spacing strip 129 and the passageway 157, is a second passageway 159 for a plate a being moved by the plate holder 54 to the embossing machine, see Fig. 3. It will be noted that the top of the passageway 159 is outwardly and downwardly inclined for the passage thereunder of a correspondingly inclined plate a held by the plate holder 54 when positioned as shown by broken lines in Fig. 15 and being moved thereby to the embossing machine.

The following connections are provided for moving the ejector plate 151 in the ways toward the plate holder 54, to wit: a bell-crank 160 is pivoted, at its elbow, to the bed plate 115 on its under side by a screw stud 161. The two arms of the bell-crank 160 are designated by the numerals 162 and 163, the former extending forwardly at the left of the housing 114 and the latter extending transversely of said housing. A short wide lever 164 is pivotally attached by a screw stud 165 to the free end portion of the arm 162. This lever 164 extends toward the embossing machine and has in its free end portion a cam surface 166 and a concave seat 167 for a wheel 27 on the carriage 16 that faces the track 17. A sear spring 168 has one of its end portions attached at 169 to the arm 162 and its other arm is attached at 169′ to the lever 164 with its intermediate portion coiled about the screw stud 165. This spring 168 is under strain to swing the lever 164 toward the track 17 and when the wheel 27 is out of engagement with the lever 164, said spring yieldingly holds the lever 164 against the track 17 as a stop. A short link 170 connects the bell-crank arm 163 to the ejector plate 151 and has on one of its end portions a depending pin 171 on a block 172 and its other end portion is pivotally attached to an upstanding pin 173 secured to the outer end portion of the bell-crank arm 163. The pivot pins 171 and 173 work in a longitudinal slot 174 in the rear end portion of the bed plate 115 at the transverse center thereof and the link 170 slidably rests on said bed plate.

The ejector plate 151 is retracted by a long coiled spring 175 anchored to a bracket 176, rearwardly of the housing 114 and secured to the crosstie bar 163, and attached to one of the screws 177 that secure the block 172 to the ejector plate 151. The spout 138, at its lower end, is held by an oblique brace 178 to an integral part of the bracket 176. This brace 178, at its lower end portion, is fitted in an inverted channel member 179 on the lower end of the spout 138 at the back thereof and secured thereto by stove bolts 180. The brace 178 extends longitudinally under the tray 143 at the transverse center thereof as a reinforcing member 181 and is secured thereto at its outer end portion by a holder 182.

A precipitated plate a in the spout 138 from the plate holder 54 is intercepted and then released by a long upright flat bar 183, the upper end portion of which is extended horizontally outwardly to afford a head member 184 under a long, flat horizontal shelf 185 for sliding contact therewith. This shelf 185 is rigidly secured at its inner end portion to the back member of the spout 138 and its inner end portion is upturned into contact with the brace 178 and secured thereto by a screw 186. The bar 183, at its lower end portion, extends forwardly and slightly downwardly through an aperture 187 in the back member of the spout 138 to afford a cut-off 188 in said spout which intercepts a plate a precipitated in the spout 138. The bar 183 from the cut-off 188 extends downwardly and slightly rearwardly to afford a follower 189 that pushes a plate a released from the cut-off 188 into the tray 143. As a plate a is moved into the tray 143, the flange 144 extends through the notches d in the plate a and holds said plate interlocked with the tray 143.

Slidably mounted on the shelf 185 is a block 190 secured to the head member 184 by a pair of screws 191 that extend through holes in said head member and a longitudinal slot 192 in the shelf 185 and have threaded engagement with the block 190. On the front end portion of the block 190 is an upstanding abutment 193 that is in engagement with the free end portion of the bell-crank arm 162 to be pushed thereby when the ejector plate 151 is being projected, see Figs. 5 and 6. A coiled spring 194 anchored to the brace 178 and attached to one of the screws 191 in the block 190 is under strain to pull the bar 183 away from the spout 138, withdraw the cut-off 188 from said spout, release the plate a intercepted thereby, and hold the abutment 193 against the bell-crank arm 162.

OPERATION

With the parts positioned, as shown in the drawings (in which an embossed plate is being held by the plate holder 54 to be ejected into the hopper 122 and a blank plate has been removed from under the stack of plates in the chamber 126 and the magazine 131 by the ejector plate 151 and positioned to be inserted into the plate holder 54 after the embossed plate has been ejected), the operator holds the plate holder 54, by means of the handle 78, to prevent the same from tilting about the axis of the rock shaft 60 and he then moves the hand crank 74 toward said handle against the tension of the spring 75 and into its position shown in Fig. 3. This movement of the hand crank 74 rotates the rock shaft 60 to position the cam surfaces 73 under the crank arms 65 to release the same and permit the spring 67 to open the upper jaw 56.

At the time the jaw 56 opens, the spring 69, which has been held under tension by the embossed plate held by the plate holder 54, ejects said plate horizontally into the hopper 122. As the ejected plate drops, by the force of gravity, into the hopper 122, the novel shape of said hopper turns the plate into a vertical position and directs the same into the spout 138. At this time, the bar 183 is being held by the bell-crank 160, which, in turn, holds the abutment against the tension of the spring 194 with the cut-off 188 extending across the spout 138 and intercepts and holds the embossed plate precipitated in said spout.

At the limit of the movement of the hand crank 74 in turning the rock shaft 60, as shown in Fig. 3, the arm 91 on the hub 92 of said hand crank has been brought into contact with the crank pin 93 on the crank arm 94 on the lower jaw 55. At this time the operator, while still holding the handle 78 and the hand crank 74, continues the movement of said hand crank in the same direction and thereby tilts the plate holder 54 through the connections 91, 93 and 94 until stopped by the engagement of the screw 95 with the body member 96 of the plate holder carrier 62. This further movement of the hand crank 74 and the handle 78 turns the rock shaft 60 about its longitudinal axis so that the upper jaw 56 continues to still remain open.

Next, the operator moves the plate carrier 62 by sliding the same on the pins 101 by means of the fingerpiece 99, to move the plate holder 54 from its dotted line position, as shown in Fig. 15, toward the blank plate positioned by the ejector plate 151. This movement of the plate holder 54 inserts the outer longitudinal edge portion of the blank plate, positioned by the ejector plate 151, between the open jaws 55 and 56. As the blank plate enters between the open jaws 55 and 56, it engages the spring 69 at its free ends and places the same under tension. As the carrier 62 is moved toward the blank plate, one of the ratchet teeth 105 slides over the ratchet tooth 106 which is a sufficient movement of the plate holder carrier 82 to position the plate holder 54 to receive a blank plate.

Next, the operator releases the hand crank 74, which is returned by the spring 75 to normal position, and at the same time turns the rock shaft 60 into a position in which the cam arms 65 are operated by the cam surfaces 73 to close the upper jaw 56 and clamp the blank plate between the two jaws 55 and 56. Next, the operator operates the thumbpiece 46 to release the latch 34 and manually move the carriage 16 toward the embossing machine, against the tension of the spring 28, which carries the blank plate held by the plate holder 54 through the passageway 159, and then operates the handle 107 to release the ratchet tooth 106 from the engaged ratchet tooth 105 and permit the tensioned spring 109 to return the carrier 62 to normal position.

During the initial movement of the carriage 16 toward the embossing machine, the wheel 27 moves out of engagement with the lever 164 and thus releases the bell-crank 160, allowing the tensioned spring 175 to move said bell-crank into a position to retract the ejector plate 151. While the ejector plate 151 is being retracted, the tensioned spring 194 retracts the bar 183 and withdraws the cut-off 188 from the spout 138 and allows the intercepted plate to drop onto the bottom of the tray 143.

During the next cycle of operation of the machine, the wheel 27, during the final movement of the carriage 16 and just before it engages the stop 32 and is automatically held by the latch 34, operates the lever 164, which, in turn, operates the bell-crank 160 to project the ejector plate 151. This projecting movement of the abutment 193, acting through the block 190 and screws 191, slides the head 184 on the shelf 185 and thus moves the bar 183 toward the spout 138 which, in turn, moves the cut-off 188 into the spout 138 to intercept the next precipitated embossed plate.

At the time the cut-off 188 enters the spout 138, the pusher 189 presses the last precipitated plate and moves all of the plates now in the tray as well as the abutment 146. It may be assumed that the space between the pusher 189 and the abutment 146 is filled with embossed plates.

It may be here stated that the blank plates are always injected into the plate holder 54 in the same order and likewise the embossed plates ejected from said holder are always moved into the tray 143 in the same order.

I claim:

1. In a [machine] *device* of the class described, [a track,] a carriage arranged to run on [the] *a* track, a plate holder mounted on the carriage for relative movement and having a fixed jaw and a movable jaw, a spring under strain to open the movable jaw, means for positioning a plate relative to the plate holder, said plate holder being manually movable to insert the positioned plate between the jaws, and spring-operated means normally holding the movable jaw closed and locked closed, said spring-operated means being manually operable to unlock and open the movable jaw to receive the positioned plate and, when released, closing the movable jaw onto the plate and locking said jaw closed.

2. In a [machine] *device* of the class described, [a track,] a carriage arranged to run on [the] *a* track, a plate holder mounted on the carriage for relative movement and having a fixed jaw and a movable jaw, a spring under strain to open the movable jaw, automatic means for positioning a plate relative to the plate holder, said plate holder being manually movable to insert the positioned plate between the jaws, and spring-operated means normally holding the movable jaw closed and locked closed, said spring-operated means being manually operable to unlock and open the movable jaw to receive the positioned plate, and, when released, closing the movable jaw onto the plate and locking said jaw closed.

3. In a [machine] *device* of the class described, [a track,] a carriage arranged to run on [the] *a* track, a plate holder mounted on the carriage for relative movement and having a fixed jaw and a movable jaw, a spring under strain to open the movable jaw, automatic means actuated by the carriage for positioning a plate relative to the plate holder, said plate holder being manually movable to insert the positioned plate between the jaws, and spring-operated means normally holding the movable jaw closed and locked closed, said spring-operated means being manually operable to unlock and open the movable jaw to receive the positioned plate and, when released, closing the movable jaw onto the plate and locking said jaw closed.

4. In a [machine] *device* of the class described, [a track,] a carriage arranged to run on [the] *a* track, a plate holder mounted on the carriage for relative horizontal bodily movement and for tilting movement in a vertical plane, said plate holder having a fixed jaw and a movable jaw, a spring under strain to open the movable jaw, means for positioning a plate relative to the plate holder, said plate holder being manually moved and tilted to insert the positioned plate between the jaws, and spring-operated means normally holding the movable jaw closed and locked closed, said spring-operated means being manually operable to unlock and open the movable jaw to receive the positioned plate and, when released, closing the movable jaw onto the plate and locking said jaw closed.

5. In a [machine] *device* of the class described, a magazine for holding a stack of plates, [a track,] a carriage arranged to run on [the] *a* track, a plate holder mounted on the carriage for relative movement and having a fixed jaw and a movable jaw, a spring under strain to open the movable jaw, automatic means for removing the lowermost plate in the stack and positioning the same relative to the plate holder, said plate holder being manually movable to insert the positioned plate between the jaws, and spring-operated means normally holding the movable jaw closed and locked closed, said spring-operated means being manually operable to unlock and open the movable jaw to receive the positioned plate and, when released, closing the movable jaw onto the plate and locking said jaw closed.

6. In a [machine] *device* of the class described, [a track,] a carriage arranged to run on [the] *a* track, a plate holding on the carriage having a movable jaw and a plate ejector spring, means for positioning a plate relative to the plate holder, means for operating the plate holder to insert the positioned plate between the plate holder and its jaw, said ejector spring being arranged to be placed under tension by the inserted plate, and means for operating the jaw to hold the inserted plate which, in turn, holds the ejector spring inactive.

7. In a [machine] *device* of the class described, [a track,] a carriage arranged to run on [the] *a* track, a carrier mounted on the carriage for relative movement, a normally horizontal plate holder mounted on the carrier to tilt about a horizontal axis and having a fixed lower jaw and a movable upper jaw hinged thereto, a spring under strain to open the movable jaw, spring-operated means normally holding the movable jaw closed and locked closed, and automatic means for positioning a plate relative to the plate holder, said spring-operated means being manually held from tilting and operated to unlock and open the movable jaw and then tilted and the carrier moved to insert the positioned plate between the jaws, said spring-operated means, when released, locking and closing the movable jaw onto the plate.

8. The structure defined in claim 7, further including a hopper below the plate-positioning means and into which hopper the plate held by the jaws is discharged by manually operating the spring-operated means to release the upper jaw and permit the same to be opened by the spring.

9. The structure defined in claim 7 in which the spring-operated means is a rock shaft, a hand crank on the shaft, cam connections between the rock shaft and the movable jaw for closing said jaw, a spring normally holding the rock shaft with the cam connections positioned to close the upper jaw, and normally inoperative connections, between the plate holder and the rock shaft, operable after the rock shaft has been moved to set the cam connections in position to release the upper jaw and permit the spring to open the same, to tilt the plate holder.

10. The structure defined in claim 7 in which the spring-operated means is a rocker shaft, a hand crank on the shaft, cam connections between the rocker shaft and the movable jaw for closing said jaw, a spring normally holding the rocker shaft with the cam connections positioned to close the upper jaw, and normally inoperative connections, between the plate holder and the rocker shaft, operable after the rocker shaft has been moved to set the cam connections in position to release the upper jaw and permit the spring to open the same, to tilt the plate holder, the means for holding the plate holder being a handle on the lower jaw having an extension substantially radial relative to the rocker shaft positioned by the hand crank to prevent the same from being tilted.

11. The structure defined in claim 7, further including a stop on the handle engageable with the carrier to limit the tilting of the plate holder.

12. The structure defined in claim 1, further including an automatic catch for holding the carriage with the plate holder in operative position relative to the plate-positioning means.

13. The structure defined in claim 1, further including a spring for moving the carriage toward the plate-positioning means, and a stop and an automatic latch for holding the carriage with the plate holder in an operative position relative to the plate-positioning means.

14. In a [machine] *device* of the class described, [a track,] a carriage arranged to run on [the] *a* track, a plate holder on the carriage having a relatively fixed lower jaw and a hinged upper jaw, said fixed jaw having a stop shoulder spaced inwardly of its outer edge, an ejector spring held relative to the lower jaw back of the stop shoulder and having end portions extending through apertures in the stop shoulder and forwardly thereof, means for positioning a plate relative to the plate holder, means for operating the plate holder for inserting the positioned plate between the jaws and against the stop shoulder and which plate in turn moves the end portions of the ejector spring inwardly and places the same under tension, and means for closing the upper jaw to hold the inserted plate between the jaws which, in turn, hold the ejector spring under tension.

15. In a [machine] *device* of the class described, [a track,] a carriage arranged to run on [the] *a* track, a plate holder on the carriage, automatic means for positioning a plate relative to the plate holder, a hopper, means for operating the plate holder to insert the positioned plate therein, said plate holder being manually operable to discharge the held plate into the hopper, a tray, a spout for conveying a plate from the hopper to the tray, including automatic means for intercepting a plate in the spout and then releasing the same, and automatic means for feeding a released plate into the tray.

16. In a [machine] *device* of the class described, [a track,] a carriage arranged to run on [the] *a* track, a plate holder on the carriage, automatic means for positioning a plate relative to the plate holder, means for operating the plate holder to insert the positioned plate horizontally therein, a hopper, a tray, a spout leading from the hopper to the tray, said plate holder being manually operable to discharge the horizontal plate therein, said hopper being constructed and arranged to turn the horizontal plate therein into a vertical position and direct the same into the spout, which holds the same in a like position and deposits the same edgewise in the tray, and automatic means for feeding plates from the spout laterally into the tray.

17. In a [machine] *device* of the class described, [a track,] a carriage arranged to run on [the] *a* track, a plate holder on the carriage, a magazine for holding a stack of plates, a spring-retracted ejector plate on which the stack of plates is supported, said ejector plate having means for holding the lowermost plate in the stack for movement therewith, means including a bell-crank actuated by the carriage for operating the ejector plate to position the plate held thereby relative to the plate holder, means for operating the plate holder to insert the positioned plate therein, and a hopper, said plate holder being manually operable to discharge the held plate into the hopper.

18. The structure defined in claim 17, further including a tray, and a spout leading from the hopper to the tray.

19. The structure defined in claim 17, further including a tray, a spout leading from the hopper to the tray, a cut-off for intercepting a plate in the spout and then releasing the same, a pusher for moving plates from the spout into the tray, a spring for retracting the cut-off and the pusher, and connections actuated by the bell-crank for operating the cut-off and the pusher.

20. In a [machine] *device* of the class described, [a track,] a carriage arranged to run on [the] *a* track, a plate holder mounted on the carriage for compound projecting and tilting movements, yielding means normally holding the plate holder retracted, automatic means actuated by the carriage for positioning and locking a plate relative to the plate holder while *the plate holder is* holding a plate under the positioned plate to be released, manually controlled means having an initial movement for operating the plate holder to release a plate held thereby, and a final movement for tilting the plate holder, and other manually operated means for projecting the plate holder to receive the positioned plate.

21. The structure defined in claim 20, further including means for conveying a release plate from the plate holder.

22. The structure defined in claim 20 in which the plate holder is returned from its tilted position by the force of gravity.

23. In a [machine] *device* of the class described, [a track,] a carriage arranged to run on [the] *a* track, a plate holder mounted on the carrier for compound projecting and tilting movements transversely of the carriage, yielding means normally holding the plate holder retracted, automatic means actuated by the carriage for positioning and locking a plate relative to the carriage and above the normal position of the plate holder while *the plate holder is* holding a plate under the positioned plate to be released, manually controlled means having an initial movement for operating the plate holder to release a plate held thereby and a final movement for tilting the plate holder, and other manually operated means for projecting the plate holder to receive the positioned plate.

24. The structure defined in claim 20, further including a spring on the plate holder constructed and arranged to be placed under tension by the insertion of a plate in the plate holder and discharging the plate when released by said plate holder.

*25. In a device of the class described, a carriage arranged to run on a track, a normally horizontal plate holder mounted on the carriage, means connecting the plate holder to the carriage for movement in horizontal and upward tilting directions relative to the carriage, releasable plate clamping means on the plate holder adapted to support a plate in a horizontal plane, plate positioning means operative to position a plate in a plane above the plane in which a plate is normally held by the plate clamping means, and manually operable means for releasing a plate from the clamping means and operative to move the plate holder in a horizontal direction on the carriage and in an upward tilting direction to thereby dispose the plate clamping means in position to clamp a plate positioned by the plate positioning means.*

*26. In a device of the class described, a carriage arranged to run on a track, a normally horizontal plate holder mounted on the carriage, means connecting the plate holder to the carriage for movement in horizontal and upward tilting directions relative to the carriage, releasable plate clamping means on the plate holder adapted to support a plate in a horizontal plane, plate positioning means operative to position a plate in a plane above the plane in which a plate is normally held by the plate clamping means, a hopper for receiving and guiding a plate released from the plate clamping means, and means for releasing a plate from the plate clamping means into the hopper and operative to move the plate holder in a horizontal direction on the carriage and in an upward tilting direction to thereby dispose the plate clamping means in position to clamp a plate positioned by the plate positioning means.*

*27. In a device of the class described, a carriage arranged to run on a track, a normally horizontal plate holder mounted on the carriage, means connecting the plate holder to the carriage for movement in horizontal and upward tilting directions relative to the carriage, releasable plate clamping means on the plate holder adapted to support a plate in a horizontal plane, plate positioning means operative to position a plate in a plane above the plane in which a plate is normally held by the plate clamping means, a hopper for receiving and guiding a plate released from the plate clamping means, means for latching the carriage against movement on the track on which the carriage is arranged and in a position aligned with the plate positioning means and the hopper, and means for releasing a plate from the plate clamping means into the hopper and operative to move the plate holder in a horizontal direction on the carriage and in an upward tilting direction to thereby dispose the plate clamping means in position to clamp a plate positioned by the plate positioning means.*

ADDRESSOGRAPH-MULTIGRAPH CORPORATION,
*Assignee of Percy R. Seward, Deceased,*
By J. B. WARD,
*Vice President and General Manager.*

REFERENCES CITED

The following references are of record in the file of this or the original patent:

UNITED STATES PATENTS

| Number | Name | Date |
|---|---|---|
| 947,397 | Owens | Jan. 25, 1910 |
| 1,893,463 | McCain | Jan. 3, 1933 |
| 2,115,455 | Chisholm | Apr. 26, 1938 |
| 2,463,690 | Gruver | Mar. 8, 1949 |